US012763869B1

(12) United States Patent
Razavi Majomard et al.

(10) Patent No.: US 12,763,869 B1
(45) **Date of Patent: *Oct. 13, 2026**

(54) UNIDIRECTIONAL FAST RETRAINING OF A BIDIRECTIONAL ETHERNET LINK

(71) Applicant: Marvell Asia Pte Ltd, Singapore (SG)

(72) Inventors: Seid Alireza Razavi Majomard, Belmont, CA (US); Ehab Tahir, Mississauga (CA); Ravi Pathakota, Fremont, CA (US); Peter van Dyck, Brüggen (DE)

(73) Assignee: Infineon Technologies Americas Corp., El Segundo, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/929,679

(22) Filed: Oct. 29, 2024

Related U.S. Application Data

(63) Continuation of application No. 18/119,295, filed on Mar. 9, 2023, now Pat. No. 12,143,205.

(60) Provisional application No. 63/318,648, filed on Mar. 10, 2022.

(51) Int. Cl.
*H04L 1/00* (2006.01)
*H04L 25/03* (2006.01)

(52) U.S. Cl.
CPC ...... *H04L 1/0001* (2013.01); *H04L 25/03019* (2013.01)

(58) Field of Classification Search
CPC ........................ H04L 1/0001; H04L 25/03019
See application file for complete search history.

(56) References Cited

U.S. PATENT DOCUMENTS

2010/0322105 A1* 12/2010 Diab ................ H04L 12/40136
370/254

* cited by examiner

*Primary Examiner* — Jean B Corrielus
(74) *Attorney, Agent, or Firm* — Meitar Patents LTD.; Daniel Kligler

(57) ABSTRACT

A PHY device in an Ethernet network in a vehicle includes a transceiver and a processor. The transceiver communicates with a peer PHY over a bidirectional Ethernet link in the vehicle, the transceiver supports communication modes that are separately configurable for transmission and reception, and are selected from (i) a data mode for communication of data, and (ii) a retraining mode for recovering from failure, and reception of reception retraining signals in the retraining mode is less sensitive to interference than reception of data signals in the data mode. The processor sets the transceiver for data mode transmission to, and data mode reception from the peer PHY, and in response to detecting that during data mode reception a reception quality has degraded to below a specified threshold, set the transceiver to reception in the retraining mode while concurrently transmitting to the peer PHY in the data mode.

18 Claims, 3 Drawing Sheets

UNIDIRECTIONAL FAST RETRAINING OF A BIDIRECTIONAL ETHERNET LINK

CROSS-REFERENCE TO RELATED APPLICATIONS

This application is a continuation of U.S. patent application Ser. No. 18/119,295, filed Mar. 9, 2023, now U.S. Pat. No. 12,143,205, which claims the benefit of U.S. Provisional Patent Application 63/318,648, filed Mar. 10, 2022. The disclosures of these related applications are incorporated herein by reference.

FIELD OF THE DISCLOSURE

The present disclosure relates generally to communication networks, and particularly to methods and systems for unidirectional fast retraining of a bidirectional Ethernet link.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE Standard for Ethernet—Amendment 5: Physical Layer Specifications and Management Parameters for 10 Mb/s Operation and Associated Power Delivery over a Single Balanced Pair of Conductors," IEEE 802.3cg-2019 February, 2020; in "IEEE Standard for Ethernet Amendment 1: Physical Layer Specifications and Management Parameters for 100 Mb/s Operation over a Single Balanced Twisted Pair Cable (100BASE-T1)," IEEE 802.3bw-2015 March, 2016; in "IEEE Standard for Ethernet Amendment 4: Physical Layer Specifications and Management Parameters for 1 Gb/s Operation over a Single Twisted-Pair Copper Cable," IEEE 802.3 bp-2016 September, 2016; and in "IEEE Standard for Ethernet—Amendment 8: Physical Layer Specifications and Management Parameters for 2.5 Gb/s, 5 Gb/s, and 10 Gb/s Automotive Electrical Ethernet," IEEE 802.3ch-2020 June, 2020.

The description above is presented as a general overview of related art in this field and should not be construed as an admission that any of the information it contains constitutes prior art against the present patent application.

SUMMARY

An embodiment that is described herein provides an Ethernet Physical Layer (PHY) device for use in an Ethernet network in a vehicle, the PHY device includes a local transceiver and a processor. The local transceiver is configured to communicate with a peer PHY transceiver over a bidirectional Ethernet link in the vehicle, the local transceiver configured to support communication modes that are separately configurable for transmission and reception, the communication modes being selected from (i) a data mode for communication of data, and (ii) a retraining mode for recovering from reception failure, and reception of retraining signals in the retraining mode is less sensitive to interference than reception of data signals in the data mode. The processor is configured to set the local transceiver for data mode transmission to the peer PHY transceiver over the Ethernet link, and for data mode reception from the peer PHY transceiver over the Ethernet link in the data mode, and in response to detecting that during data mode reception a reception quality of received signals has degraded to below a specified threshold, set the local transceiver to reception in the retraining mode while concurrently transmitting to the peer PHY transceiver in the data mode.

In some embodiments, in response to receiving from the peer PHY transceiver an alert signal indicating that the peer PHY transceiver requires retraining, the processor is configured to configure the local transceiver to transmit retraining signals to the peer PHY transceiver in the retraining mode, while continuing to receive the data signals from the peer PHY transceiver in the data mode, the retraining signals are modulated using a retraining modulation scheme, and the data signals are modulated using a data modulation scheme that is different from the retraining modulation scheme. In other embodiments, during retraining, the local transceiver is configured to receive the retraining signals modulated in accordance with a two-level Pulse Amplitude Modulation (PAM-2) modulation scheme, while continuing to transmit transmission data signals modulated in a high-order modulation scheme that encodes more than a single bit per symbol. In yet other embodiments, the high-order modulation scheme includes a PAM modulation scheme having more than two levels, or a Double Square (DSQ) modulation scheme.

In an embodiment, in response to detecting that following retraining the reception quality level exceeds another specified signal quality threshold, the processor is configured to reset the local transceiver to reception from the peer PHY transceiver in the data mode while continuing to concurrently transmit to the peer PHY transceiver in the data mode. In another embodiment, the local transceiver includes a reception path including an adaptive equalizer having one or more taps, and in receiving the retraining signals in the retraining mode, the transceiver is configured to adapt the one or more taps starting with their respective recent values in the data mode, rather than initializing the one or more taps to other initialization values. In yet another embodiment, a duration of adaptation of the one or more taps while the local transceiver continues to transmit to the peer PHY transceiver in the data mode, for achieving a given quality level of reception in the local transceiver, is shorter in the retraining mode than in a link-establishment training.

In some embodiments, the local transceiver is coupled to a sensor in the vehicle, the peer PHY transceiver is coupled to the Ethernet network, and the local transceiver is configured to transmit data to a computer coupled to the Ethernet network, via the peer PHY transceiver, in the data mode at a first data rate, and to receive control data from the computer via the peer PHY transceiver in the data mode at a second data rate lower than the first data rate. In other embodiments, the Ethernet PHY transceiver includes a MAC layer configured to manage (i) uninterrupted transmission of the data signals to the peer PHY transceiver in the data mode, and (ii) pausing transmission of the data signals to the peer PHY transceiver while transmitting the retraining signals to the peer PHY transceiver in the retraining mode. In yet other embodiments, in response to identifying that the peer PHY transceiver also requires retraining, the processor is configured to coordinate with the peer PHY transceiver serial retraining of the local PHY transceiver and the peer PHY transceiver in a specified order.

There is additionally provided, in accordance with an embodiment that is described herein, a method for communication including, in an Ethernet Physical Layer (PHY) device for use in an Ethernet network in a vehicle, communicating with a peer PHY transceiver over a bidirectional Ethernet link in the vehicle, the local transceiver supports communication modes that are separately configurable for transmission and reception, the communication modes being selected from (i) a data mode for communication of data, and (ii) a retraining mode for recovering from reception failure, reception of retraining signals in the retraining mode is less sensitive to interference than reception of data signals in the data mode. The local transceiver is set for data mode transmission to the peer PHY transceiver over the Ethernet link, and for data mode reception from the peer PHY transceiver over the Ethernet link in the data mode. In response to detecting that during data mode reception a reception quality of received signals has degraded to below a specified threshold, the local transceiver is set to reception in the retraining mode while concurrently transmitting to the peer PHY transceiver in the data mode.

The present disclosure will be more fully understood from the following detailed description of the embodiments thereof, taken together with the drawings in which:

DETAILED DESCRIPTION OF EMBODIMENTS

Figure 1:
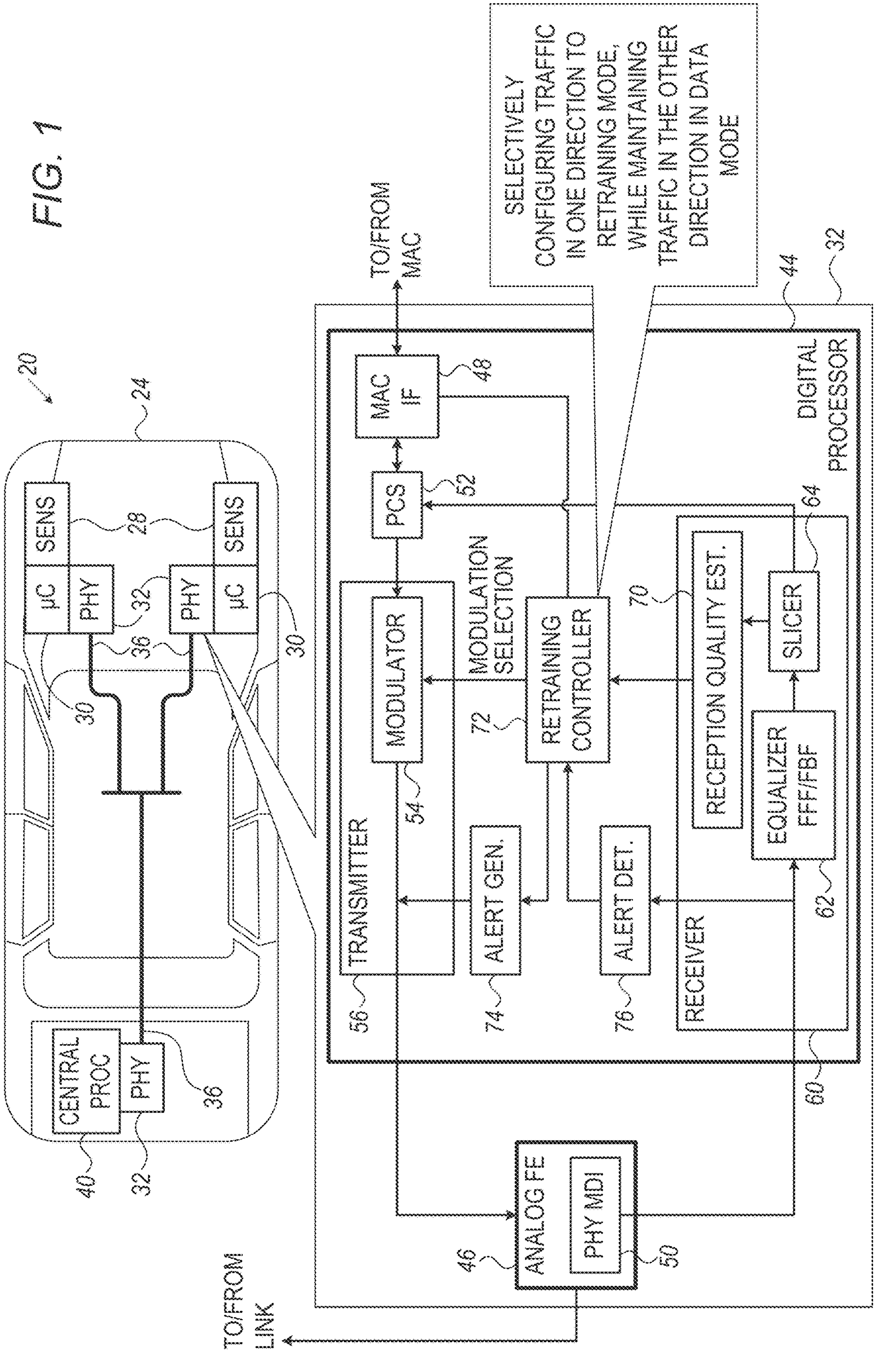
FIG. 1 is a block diagram that schematically illustrates an automotive communication system supporting unidirectional fast link retraining, in accordance with an embodiment that is described herein.

Embodiments that are described herein provide methods and systems for unidirectional fast retraining of a bidirectional Ethernet link connecting between physical-layer (PHY) interfaces. The embodiments described herein are described in the context of automotive applications, e.g., systems that collect data from sensors within a vehicle. This choice is for descriptive purposes, however, it is made solely for the sake of clarity. The disclosed techniques are equally applicable in other applications, for example in industrial and/or smart-home networks, e.g., in BASE-T links used in data centers, and enterprise market.

A Vehicle Ethernet network typically is required to deliver large amounts of data at high-speeds and low latencies, under extreme environmental conditions. On the other hand, in-vehicle communication needs to be highly reliable, e.g., for safety reasons. Electronic components within the vehicle may be subjected to Electromagnetic Interference (EMI) from various sources or electrostatic discharge, which may corrupt electrical signals, such as signals carrying data over Ethernet links leading to communication errors and system malfunction.

Sources of EMI may reside within a vehicle or externally to the vehicle. External EMI sources include, for example, radio towers, electric power transmission lines and airport radar, and many others. EMI sources that are internal to the vehicle include, for example, the vehicle engine and other mechanical and electromechanical components, the windshield wipers, mobile phones, an infotainment system, and the like.

Consider two PHY devices interconnected using a wire link such as a twisted-pair cable or a coaxial cable. Each of the PHY devices comprises a transmitter and a receiver for communicating with the other PHY device. An EMI signal may be picked up by the cable (e.g., by electromagnetic induction) and propagate both sides to the PHY devices, acting as an interference or noise that interferes with reception of actual Ethernet signals communicated between the two PHY devices. Each PHY device typically connects to the twisted-pair cable or the coaxial cable using a differential amplifier that ideally eliminates EMI signals picked up by the twisted-pair wires.

The impact of a common EMI source on the reception quality in each of the PHY devices may be very different for various reasons. For example, the common EMI source may interfere more severely with the PHY device to which it is physically closer. As another example, an EMI signal typically is not fully mitigated (e.g., eliminated) at the output of the differential amplifier and may be subjected to different gains by the differential amplifiers of the two PHY devices.

In some applications, different data rates are communicated in opposite directions of the bidirectional link. For example, in an automotive application, high-speed data typically is sent from a sensor of the vehicle to a central processor, whereas low-rate control messages are sent from the central processor to the sensor. The receiver of the high-rate data may be affected by EMI more severely than the receiver of the low-speed data for several reasons. For example, the insertion loss of the cable (e.g., the amount of signal power loss as the signal travels from one side of the cable to the opposite side) typically is higher at higher data rates. This means that with similar transmission powers, the reception quality of a receiver is lower at higher data rates, making that receiver more prone to EMI. In addition, to compensate for the attenuated signal, the receiver may be required to amplify the received signal including the EMI signal with higher gains for higher data rates. Moreover, at a high data rate (high bandwidth), the receiver may be exposed to a larger variety of EMI sources compared to a low data rate (low bandwidth).

To establish a communication link between the PHY devices, the PHY devices typically perform a bidirectional training procedure. During the bidirectional training, each of the PHY devices transmits training data for training the receiver of the opposite side PHY device. Based on the training data, each of the receivers adapts its equalizer taps to achieve high reception quality. The initial procedure may take on the order of 100 training milliseconds, during which no data can be communicated. After the initial training concludes, the PHY devices can communicate data with one another, over the twisted-pair link, using designated modulation schemes and data rates.

During data communication, an EMI source may temporarily cause severe degradation in reception quality in only one of the PHY devices. Conventionally, in response to degradation in one of the receivers, the PHY devices may recover the communication link, similarly to the full bidirectional training mentioned above, by performing a bidirectional retraining procedure to retrain the receivers of both PHY devices. A major drawback of this approach is that during the bidirectional retraining, both receivers are occupied in retraining and cannot receive data, even though the receiver not affected by EMI could in principle continue to receive data from the other PHY in the presence of the EMI. With bidirectional retraining, data is held until the retraining concludes. Data transfer is thus delayed, which may cause safety issues in various applications such as automotive applications.

Consider an Ethernet PHY device for use, e.g., in an Ethernet network in a vehicle. The transceiver comprises a local transceiver and a processor. The local transceiver is configured to communicate with a peer PHY transceiver over a bidirectional Ethernet link in the vehicle, the local transceiver configured to support communication modes that are separately configurable for transmission and reception, the communication modes being selected from (i) a data mode for communication of data, and (ii) a retraining mode for recovering from reception failure, wherein reception of retraining signals in the retraining mode is less sensitive to interference than reception of data signals in the data mode. The processor is configured to set the local transceiver for data mode transmission to the peer PHY transceiver over the Ethernet link, and for data mode reception from the peer PHY transceiver over the Ethernet link in the data mode. In response to detecting that during data mode reception a reception quality of received signals has degraded to below a specified threshold, the processor sets the local transceiver to reception in the retraining mode while concurrently transmitting to the peer PHY transceiver in the data mode.

In some embodiments, in response to receiving from the peer PHY transceiver an alert signal indicating that the peer PHY transceiver requires retraining, the processor configures the local transceiver to transmit retraining signals to the peer PHY transceiver in the retraining mode, while continuing to receive the data signals from the peer PHY transceiver in the data mode. The retraining signals are modulated using a retraining modulation scheme, and the data signals are modulated using a data modulation scheme that is different from the retraining modulation scheme. For example, the local transceiver receives the retraining signals modulated in accordance with a two-level Pulse Amplitude Modulation (PAM-2) modulation scheme that encodes a single bit per symbol, while continuing to transmit transmission data signals modulated in a high-order modulation scheme that encodes more than a single bit per symbol.

In an embodiment, in response to detecting that following retraining the reception quality level exceeds another specified signal quality threshold (indicating that the retraining has concluded successfully), the processor resets the local transceiver to reception from the peer PHY transceiver in the data mode while continuing to concurrently transmit to the peer PHY transceiver in the data mode.

In some embodiments, the local transceiver comprises a reception path including an adaptive equalizer having one or more taps. In such embodiments, in receiving the retraining signals in the retraining mode, the transceiver adapts the one or more taps starting with their respective recent values in the data mode rather than initializing the taps to other initialization values, which makes the retraining phase shorter than full link establishment training phase.

Unidirectional retraining is applicable, for example, in automotive applications. In such applications, the local transceiver is coupled to a sensor in the vehicle and the peer PHY transceiver is coupled to the Ethernet network. In the data mode, the local transceiver transmits data to a computer coupled to the Ethernet network via the peer PHY transceiver, at a first data rate, and receives control data from the computer via the peer PHY transceiver at a second data rate lower than the first data rate.

In some embodiments, the Ethernet PHY transceiver comprises a MAC layer configured to manage (i) uninterrupted transmission of the data signals to the peer PHY transceiver in the data mode, and (ii) pausing transmission of the data signals to the peer PHY transceiver while transmitting the retraining signals to the peer PHY transceiver in the retraining mode. In some embodiments, in response to identifying that the peer PHY transceiver also requires retraining, the processor coordinates with the peer PHY transceiver serial retraining of the local PHY transceiver and the peer PHY transceiver in a specified order.

In the disclosed techniques, a local PHY and a peer PHY carry out a unidirectional retraining method, according to which only the PHY whose receiver suffers large degradation in reception quality is retrained, while continuing to normally transmit data to the other PHY. Since the channel is retrained in only one direction, while the opposite direction remains the channel bandwidth can be used much more efficiently compared to conventional bidirectional retraining.

FIG. 1 is a block diagram that schematically illustrates an automotive communication system 20 supporting unidirectional fast link retraining, in accordance with an embodiment that is described herein.

Communication system 20 is installed in a vehicle 24, in an embodiment, and comprises multiple sensors 28, multiple microcontrollers 30, and multiple Ethernet physical layer (PHY) devices 32 (also referred to as PHYs or Ethernet transceivers). In the example of FIG. 1, PHY devices 32 are interconnected by an Ethernet network configured in a multidrop topology. In other embodiments, e.g., in high-speed communication where fast retraining is applicable, a point-to-point topology can be used. The PHY devices connect to the Ethernet network using links 36. Alternatively, or additionally, a zonal architecture can also be used.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

PHY devices 32 typically operate at least partially in accordance with one or more of the IEEE 802.3 Ethernet standards, e.g., the IEEE 802.3ch-2020 standard cited above. Although the techniques described herein pertain mainly to the physical layer, PHY devices 32 may also perform Medium Access Control (MAC) functions as well, in an embodiment.

Depending on the applicable Ethernet standard, links 36 may comprise any suitable physical medium. In the embodiments described herein, although not necessarily, each link 36 comprises a single pair of wires, e.g., a single twisted-pair link that is optionally shielded. In alternative embodiments, links 36 may comprise single-ended wire links, not necessarily Ethernet compliant.

In the present example, each sensor 28 is connected to a respective microcontroller 30, which is in turn connected to a respective PHY device 32. In other embodiments, however, sensor frames may be output directly to the PHY, without intermediate translation to a Mobile Industry Processor Interface (MIPI). The PHY device 32 of each sensor is connected by a link 36 to peer PHY devices 32 coupled to the Ethernet network. On the sensor side of a given link, microcontroller 30 serves as a Medium Access Control (MAC) controller. Microcontrollers 30 are thus also referred to herein as MAC devices, hosts, or Systems-on-Chip (SoC). In some embodiments, the PHY circuitry and the circuitry that performs MAC functions (e.g., microcontroller) are integrated in the same device. In the present example, a central processor 40 (on the left-hand side of the figure) is connected via the Ethernet network but is not connected directly to any sensor. Alternatively, or additionally, central processor 40 may connect directly to one or more sensors (or to microcontrollers 30 of the sensors), in an embodiment.

The PHY devices 32 and links 36 form an Ethernet network within vehicle 24. Using this vehicle Ethernet network, central processor 40 sends control messages to sensors 28, and receives information captured by the sensors. The data rate in sending sensor data from the sensor to the central processor is typically much higher than the data rate in sending control data from the central processor to the sensor. The multidrop topology of the Ethernet network depicted in FIG. 1 is given by way of example, and other suitable topologies can also be used, e.g., topologies that include one or more switches one or more sensor bridges, and/or more than a single central processor 40. In some embodiments, e.g., in high-speed communication where fast retraining is applicable, a point-to-point topology can be used. Alternatively, or additionally, a zonal architecture can also be used.

As will be described below, in the disclosed embodiments, PHYS coupled to a bidirectional link may selectively retrain the link in one direction while continuing to transfer data in the opposite direction. A configuration of this sort is also referred to herein as "unidirectional retraining".

An inset at the bottom of FIG. 1 shows the internal structure of a PHY device 32, in an embodiment. PHY device 32 comprises a digital processor 44 and an analog Front End (FE) 46. In an embodiment, digital processor 44 comprises a MAC interface (IF) 48, which is configured to communicate with a MAC device, e.g., of sensor 28, or central processor 40. Analog FE 46 comprises a PHY Media-Dependent Interface (MDI) 50, which is configured to transmit and receive analog Ethernet signals over an MDI channel comprising a physical link 36 (e.g., a twisted-pair link). In an embodiment, digital processor 44 comprises a Physical Coding Sublayer (PCS) 52, which is configured to perform various digital data processing, such as data encoding and decoding and data scrambling and descrambling, to name a few.

In the description that follows, the terms "transmit direction" and "receive direction" refer to PHY 32 respectively transmitting and receiving analog Ethernet signals to and from an MDI channel via MDI 50.

In the transmit direction, digital processor 44 of PHY device 32 receives data in a digital form, via MAC interface 48. The data are processed by digital processor 44 and are further processed by analog FE 46 that produces an analog Ethernet signal carrying the data. The analog FE transmits the analog Ethernet signal via MDI 50. The transmission path within processor 44 comprises a modulator 54 within a transmitter 56. Modulator 54 converts input bits received from the PCS into symbols in accordance with a suitable modulation scheme.

In the present example, PAM modulator 54 supports a two-level (PAM-2) modulation scheme and a higher order modulation scheme such as a four-level (PAM-4) modulation scheme. The high-order modulation scheme encodes more than a single bit per symbol such as PAM-4 is used for transmitting and receiving Ethernet data signals carrying data, and PAM-2 is used for transmitting and receiving Ethernet retraining signals carrying retraining data. It is noted that using a PAM-4, or other higher order PAM schemes is not mandatory, and other embodiments can use any other suitable high-order modulation scheme. High-order modulation schemes applicable for the data transmission in PHY 32 comprise PAM schemes such as PAM-4, PAM-8 and PAM-16, and Double Square (DSQ) schemes such as DSQ-64, DSQ-128, and DSQ-256, for example. Transmitter 56 converts the modulated symbols to digital Ethernet signals, which the analog FE converts to corresponding analog Ethernet signals. In the present example, it is mainly assumed that the PAM-4 modulation scheme is used for modulating the data signals.

In the receive direction, analog front end (FE) 46 receives, via MDI 50, an analog Ethernet signal carrying data (e.g., user data or retraining data). The analog Ethernet signal is processed by analog FE 46 followed by digital processor 44 that recovers the data. The digital processor delivers the recovered data to a peer MAC device via MAC interface 48. The receive path within processor 44 comprises a receiver 60 comprising a digital equalizer 62, a slicer 64 and a reception quality estimator 70.

In the present example, equalizer 62 comprises a digital filter of any suitable type such as, for example, a digital filter organized in a Feed-Forward-Filter (FFF) and a Feed-Back-Filter (FBF) configuration (also denoted FFF/FFB). In an embodiment, equalizer 62 comprises one or more taps (not shown) whose values are adaptable in accordance with the underlying time-varying channel for achieving highest reception quality.

Slicer 64 receives filtered symbols from equalizer 62 and decides on the bits corresponding to the filtered symbols. In an embodiment, the slicer applies different respective decision schemes for the PAM-2 and PAM-4 nodulation schemes. The receiver sends the detected bits to PCS 52 followed by MAC IF 48.

Reception quality estimator 70 monitors the reception quality of receiver 60. The reception quality estimator may be part of receiver 62 as shown in the figure or may reside externally to the receiver. Reception quality estimator 70 may estimate the reception quality using any suitable quality estimation method such as, for example, based on evaluating an "eye" diagram of the symbols output by equalizer 62. The reception quality measured may be specified, for example, in terms of Signal to Noise Ratio (SNR), Bit Error Rate (BER) or any other suitable reception quality measure.

In some embodiments, digital processor 44 comprises a retraining controller 72 that handles unidirectional retraining for the PHY. Retraining the receiver may be required when the reception quality degrades significantly (e.g., due to EMI). During retraining, the receiver receives from the peer PHY retraining signals carrying retraining data to be used for adapting the equalizer taps to mitigate the EMI. Retraining is typically faster than training for link establishment because taps adaptation continues based on their recent values rather than initializing the taps as in the full link establishment training. Fast retraining is advantageous because more time remains for transmission of data.

In some embodiments, the retraining controller indicates to MAC IF 48 to selectively pause transmission of data in the failed link direction while retraining in the failed link direction and continuing data transmission in the non-failed link direction. In such embodiments, the underlying MAC layer is configured to manage (i) uninterrupted transmission of the data signals to the peer PHY transceiver in the data mode, and (ii) pausing PHY transmission of the data signals to the peer transceiver while transmitting the retraining signals to the peer PHY transceiver in the retraining mode.

With unidirectional retraining, even though Ethernet communication over the link is essentially bidirectional, retraining is performed only in the direction in which the receiver has failed, while data communication continues normally in the other direction. For example, in PHY device 32, receiver

60 may be retrained, while concurrently transmitter 56 continues to transmit data to the peer PHY. As another example, PHY transmitter 54 may transmit retraining data to the peer PHY to retrain the receiver of the peer PHE, while concurrently receiver 60 continues to receive data from the peer PHY.

In some embodiments, digital processor 44 coordinates retraining with the peer PHY using an alert generator 74 and an alert detector 76, as described herein.

While receiver 60 receives data from the peer PHY, retraining controller receives 72 reception quality measurements from reception quality estimator 70. In response to detecting that the reception quality has degraded below a specified quality threshold, the retraining controller triggers alert generator 74 to transmit an outbound alert signal to indicate the peer PHY to set its transmitter to transmit retraining signals carrying retraining data to PHY 32 for retraining receiver 60.

In an embodiment, alert detector 76 monitors the signals received over the twisted-pair cable from the peer PHY. Upon detecting an inbound alert signal received that the peer PHY has sent for indicating PHY32 that the receiver of the peer PHY requires retraining, the alert detector triggers (e.g., via retraining controller 72) transmitter 56 to transmit retraining data to the peer PHY, for retraining the receiver of the peer PHY.

Figure 2:
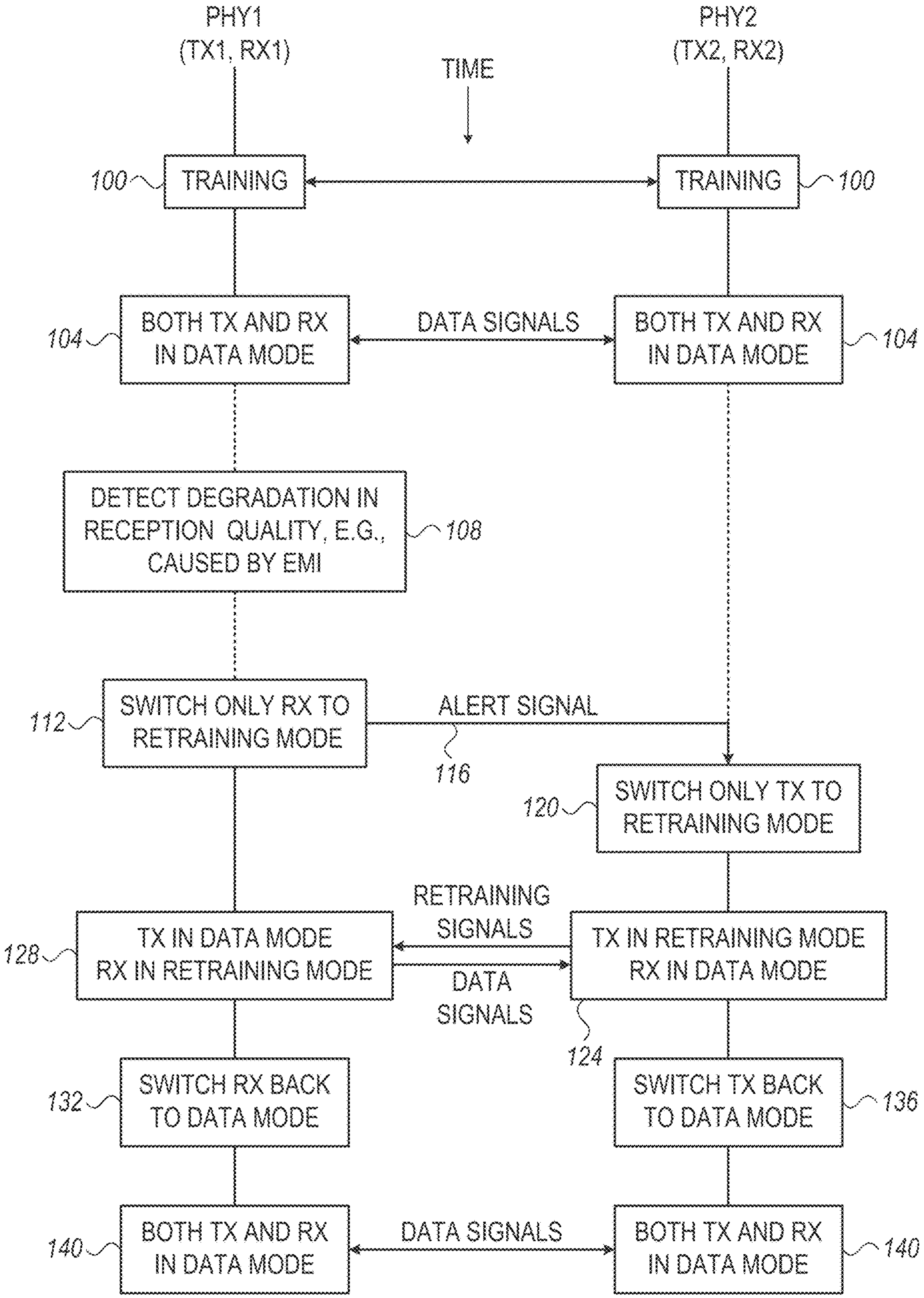
FIG. 2 is a timing flow diagram that schematically illustrates communication phases in establishing a communication link and performing unidirectional retraining, in accordance with an embodiment that is described herein.

FIG. 2 is a timing flow diagram that schematically illustrates communication phases in establishing a performing unidirectional communication link and retraining, in accordance with an embodiment that is described herein.

The description of the timing diagram in FIG. 2 refers to Ethernet PHY devices denoted PHY1 and PHY2 that communicate with one another over a twisted-pair link. The transmitter and receiver of PHY1 are respectively denoted TX1 and RX1, whereas the transmitter and receiver of PHY2 are respectively denoted TX2 and RX2.

PHY1 and PHY2 may be configured to perform a full bidirectional training procedure to establish an active communication link. During link-establishment link training is bidirectional such that the receivers of both PHY1 and PHY2 are trained (e.g., concurrently).

In the description that follows it is assumed that the transmitter and receiver in each of PHY1 and PHY2 may be separately and selectively configured to operate in a "data mode" or in a "retraining mode", which are described herein.

The data mode is used for data communication between the PHY devices during which sensor data and control data may be transmitted in opposite directions. The transmitter of PHY1 and the receiver of PHY2 may be configured to operate in the data mode for transmitting user data from PHY1 to PHY2. Similarly, the receiver of PHY1 and the transmitter of PHY2 may be configured to operate in the data mode for sending user data from PHY2 to PHY1.

The retraining mode is used for fast recovery of the communication link. The receiver of PHY1 and the transmitter of PHY2 may be configured to operate in the retraining mode for retraining the receiver of PHY1. Similarly, the transmitter of PHY1 and the receiver of PHY2 may be configured to operate in the retraining mode for retraining the receiver of PHY2.

The disclosed embodiments mainly to refer unidirectional retraining, meaning that the receiver in a PHY that suffers degradation in reception quality will be retrained in the retraining mode, while the transmitter of the same PHY device continues to transmit data to the peer PHY in the data mode.

In the description that follows, data communicated in the data mode are carried in Ethernet signals denoted "data signals" that are modulated using a high-order modulation scheme that encodes more than a single bit per symbol, e.g., the PAM-4 scheme. Retraining data communicated in the retraining mode are carried in Ethernet signals denoted "retraining signals" that are modulated using the PAM-2 scheme. Alternatively, other PAM schemes or non-PAM schemes (e.g., DSQ modulation schemes) can also be used.

The process in FIG. 2 begins with PHY1 and PHY2 performing a bidirectional link establishment training method 100, e.g., upon power up or reset. During the training, transmitter TX1 of PHY1 transmits training data over the link to train receiver RX2 of PHY2, and TX2 of PHY2 transmits training data over the link to train receiver RX1 of PHY1. Based on the training data, each of receivers RX1 of PHY1 and RX2 of PHY2 adapts its equalizer to achieve best reception quality. After the training concludes, both PHY1 and PHY2 switch to data mode 104 in which PHY1 and PHY2 communicate data with one another using the high-order modulation scheme.

At an interference/noise detection operation 108, RX1 of PHY1 locally detects degradation in reception quality, possibly caused by EMI or other noise or interference. In the present example, although the EMI causes significant degradation in reception quality in RX1, the reception quality in RX2 remains sufficiently high. It is noted that due to the degradation in reception quality, RX1 of PHY1 needs to be retrained, but RX2 of PHY2 does not. To retrain its receiver RX1, switches RX1 PHY1 (but not its transmitter TX1) to the retraining mode 112. In addition, TX1 transmits to PHY2 an alert signal 116 (generated by alert generator 74) to signal PHY2 that RX1 requires retraining. In response to receiving the alert signal, PHY2 switches its transmitter TX2 (but not its receiver RX2) to the retraining mode 120.

During retraining, while RX1 of PHY1 is being retrained based on retraining data transmitted by TX2 in retraining mode 124, TX1 continues to transmit data to RX2 of PHY2 in data mode 128. Overall, in the present example, in the retraining mode, PHY1 and PHY2 communicate retraining data in the direction from PHY2 to PHY1 but continue to communicate data in data mode in the direction from PHY1 to PHY2.

After successful retraining, RX1 of PHY1 switches back to data mode 132 and TX2 of PHY2 switches back to data mode 136. At this stage, PHY1 and PHY2 communicate data with one another bidirectionally in data mode 140.

Figure 3:
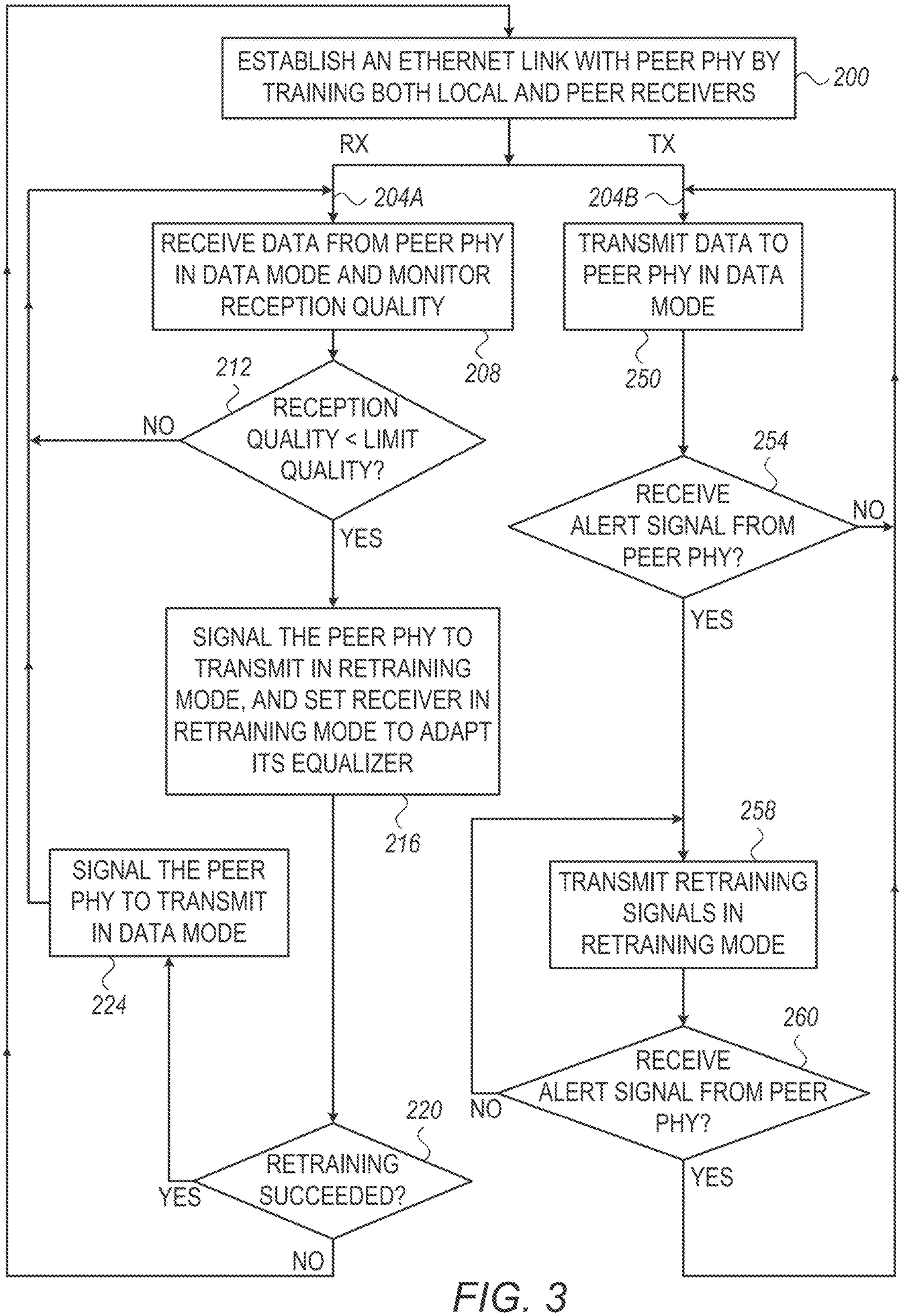
FIG. 3 is a flow chart that schematically illustrates a method for unidirectional link retraining, in accordance with an embodiment that is described herein.

FIG. 3 is a flow chart that schematically illustrates a method for unidirectional link retraining, in accordance with an embodiment that is described herein.

The method of FIG. 3 will be described as executed by a local PHY 36 denoted PHY1, which is assumed to be connected over a bidirectional Ethernet link to a peer PHY 36 denoted PHY2.

The method begins with local PHY1 establishing an Ethernet link with peer PHY2 by performing bidirectional training to train both local and peer receivers (60), at a training operation 200. Following training, the link is ready for data communication and the method splits between a reception loop 204A and a transmission loop 204B that are executed in parallel to one another.

The reception loop begins at a reception operation 208, with receiver 60 of PHY1 operating in the data mode and receiving from peer PHY2 Ethernet signals (signals) carrying data. During reception operation 208, reception quality estimator 70 of PHY1 monitors the reception quality.

At a quality query operation 212, the retraining controller checks whether the reception quality exceeds a specified limit quality (e.g., threshold quality), and if not, the method loops back to operation 208 to receive subsequent data from peer PHY2 in data mode. Otherwise, the reception quality has degraded below the limit quality, and the method proceeds to a poor reception signaling operation 216.

At operation 216 PHY1 signals peer PHY2 to transmit in retraining mode, e.g., by triggering alert generator 74 to transmit an alert signal to PHY2. In addition, PHY1 configures its receiver 60 to operate in the retraining mode for adapting the taps of its equalizer 62 for best reception in the presence of the EMI.

At a retraining termination query operation 220, retraining controller 70 checks whether the retraining procedure has concluded successfully. In an example embodiment, the retraining controller checks whether the reception quality after retraining is above the quality limit (or above another quality limit).

When retraining has succeeded, the retraining controller triggers alert generator 74 to transmit another alert signal to PHY2 indicating PHY2 to switch its transmitter to the data mode, at a successful retraining signaling operation 224. The alert signals at operations 224 and 216 may be essentially the same. Alternatively, the alert signal at operation 224 may be different from the one at operation 216, e.g., have the same waveform shape but opposite polarity. In an embodiment, the alert signal may comprise a special waveform or a special message embedded in the transmitted data stream similar to the Operation, Administration, Management (OAM) mechanism, for example. Following operation 224, the method loops back to operation 208 to receive data from peer PHY2 in data mode.

When at operation 220 retraining has failed, the method loops back to operation 200 to re-establish the communication link by performing full bidirectional link establishment training.

The transmission loop (204B) begins at a transmission operation 250, with PHY1 transmitting to peer PHY2 Ethernet signals (data signals) carrying data, in data mode. At an alert query operation 254, PHY1 checks whether it has received from PHY2 an alert signal indicating PHY1 to switch its transmitter to the retraining mode. In an embodiment, operation 254 may be carried out implicitly by interrupting the data transmission operation 250.

When no alert signal has been received, PHY1 loops back to operation 250 to continue transmitting in the data mode. Otherwise, an alert signal has been received, and PHY1 proceeds to a retraining transmission operation 258 at which PHY1 transmits retraining data (carried in retraining signals) to peer PHY2 for retraining the receiver of PHY2. At a second alert query operation 260, PHY1 checks whether another alert signal has been received from PHY2, and if not, loops back to operation 258 to continue transmission in the retraining mode. Otherwise, an alert signal has been received, that indicates to PHY1 that retraining the receiver of PHY2 has concluded successfully, in which case the method loops back to operation 250 to transmit data to peer PHY2 in data mode.

It is noted that in the method of FIG. 3 the reception and transmission loops 204A and 204B are separated and operate independently from one another. This means that although in response to detecting degradation in reception quality, the local PHY switches its receiver to the retraining mode, unlike in bidirectional retraining the local PHY refrains from also switching its transmitter to the retraining mode. Similarly, although in response to receiving an alert signal from the peer PHY, the local PHY switches its transmitter to the retraining mode, unlike in bidirectional retraining the local PHY refrains from also switching its receiver to the retaining mode.

The configurations of communication system 20 and its components, such as the internal structure of PHY devices 32, as shown in FIG. 1, are example configurations that are depicted solely for the sake of clarity. In alternative embodiments, any other suitable configurations can be used. For example, the disclosed techniques can be used in any other suitable network or link topology, e.g., a topology that includes one or more switches. As another example, the disclosed techniques can be used in a point-to-point Ethernet link between two PHY devices or switches. Elements that are not mandatory for understanding of the disclosed techniques have been omitted from the figure for the sake of clarity.

In the example PHY configuration shown in FIG. 1, Analog FE 46 and digital processor 44 are implemented as separate Integrated Circuits (ICS). In alternative embodiments, however, the analog FE and digital processor may be integrated on separate semiconductor dies in a single Multi-Chip Package (MCP) or System on Chip (SoC and may be interconnected by an internal bus.

The different elements of communication system 20 and its various components may be implemented using dedicated hardware or firmware, such as using hard-wired or programmable logic, e.g., in an Application-Specific Integrated Circuit (ASIC) or Field-Programmable Gate Array (FPGA). Additionally, or alternatively, some functions, e.g., functions of digital processor 44 such as transmitter 56, receiver 60 and retraining controller 72 may be implemented in software and/or using a combination of hardware and software elements. Hardware implementation may be necessary for reducing latency, e.g., for safety in sensitive applications such as in automotive applications.

In some embodiments, digital processor 44 comprises a programmable processor, e.g., a Digital Signal Processor (DSP) or other suitable processor, which is programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

The embodiments described above are given by way of example, and other suitable embodiments can also be used. For example, although the embodiments described above refer mainly to retraining a link failure in one direction, in other embodiments, the link may fail in both directions concurrently (e.g., close in time to one another). In this case, in accordance with the embodiments above, each of the PHYs retrains the other PHY in response to receiving an alert signal. This approach reduces the duration of low quality link, and data loss in both directions. Moreover, with this approach, the link stays in bad state for a short time, therefore avoiding significant divergence of the receivers from ideal settings.

In another approach, when the link fails in both directions concurrently, the PHYs are retrained serially. This means that one of the PHYs will be retrained after retraining the other PHY concludes. In real life scenarios, even when both sides of the link are affected by EMI at the same time, one of the PHYs declares a bad link sooner than other PHY and will be retrained first. Therefore, the PHY that has failed first can be recovered sooner than the other PHY. Typically, the PHY that has failed first is affected by EMI more than the other PHY. After retraining in one direction concludes, retraining in the opposite direction is carried out, in an embodiment.

The serial: approach can be implemented using a low-complexity state machine, which is beneficial, e.g., in interoperability tests where PHYS from two different vendors are used for a common link. In some embodiments, e.g., in automotive applications, upon failing in both directions, the PHYs may be retrained in an order that ensures low recovery latency in one of the directions, e.g., for safety reasons. In some embodiments, in response to identifying by one of the PHYs that the peer PHY transceiver also requires retraining, the local transceiver coordinates with the peer PHY transceiver serial retraining of the local PHY transceiver and the peer PHY transceiver in a specified order.

Although the embodiments described herein mainly address unidirectional retraining in automotive applications, the methods and systems described herein can also be used in other applications, such as in BASE-T methods such as those mentioned in EEE specifications such as 802.3an (10G), 802.3bz (5G/2.5G), 802.3bq (1G). These and other standards are designed for data center, enterprise market such as various servers, switches, Personal Computer (PC), laptop, access points, printers, security cameras and the like.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Ethernet Physical Layer (PHY) device for use in an Ethernet network in a vehicle, the PHY device comprising:

a local transceiver configured to communicate with a peer transceiver over a bidirectional Ethernet link in the vehicle; and a processor, configured to:

set the local transceiver to receive inbound data signals from the peer transceiver; and in response to detecting that a reception quality of the inbound data signals has degraded to below a specified threshold, (i) alert the peer transceiver that retraining of the local transceiver is required, and (ii) set the local transceiver to receive inbound retraining signals from the peer transceiver while concurrently transmitting outbound data signals to the peer transceiver.

2. The Ethernet PHY device according to claim 1, wherein, in response to receiving from the peer transceiver an alert signal indicating that the peer transceiver requires retraining, the processor is configured to configure the local transceiver to transmit outbound retraining signals to the peer transceiver, while continuing to receive the inbound data signals from the peer transceiver.

3. The Ethernet PHY device according to claim 1, wherein the local transceiver is configured to receive the inbound retraining signals modulated in accordance with a two-level Pulse Amplitude Modulation (PAM-2) modulation scheme, while continuing to transmit the outbound data signals modulated in a high-order modulation scheme that encodes more than a single bit per symbol.

4. The Ethernet PHY device according to claim 3, wherein the high-order modulation scheme comprises a PAM modulation scheme having more than two levels, or a Double Square (DSQ) modulation scheme.

5. The Ethernet PHY device according to claim 1, wherein, in response to detecting that following the retraining the reception quality level exceeds another specified signal quality threshold, the processor is configured to reset the local transceiver to receive the inbound data signals from the peer transceiver while continuing to concurrently transmit the outbound data signals to the peer transceiver.

6. The Ethernet PHY device according to claim 1, wherein the local transceiver comprises a reception path including an adaptive equalizer having one or more taps, and wherein, in receiving the inbound retraining signals, the local transceiver is configured to adapt the one or more taps starting with their respective recent values, rather than initializing the one or more taps to other initialization values.

7. The Ethernet PHY device according to claim 6, wherein a duration of adaptation of the one or more taps while the local transceiver continues to transmit the outbound data signals to the peer transceiver, for achieving a given quality level of reception in the local transceiver, is shorter in the retraining than in link-establishment training.

8. The Ethernet PHY device according to claim 1, wherein the Ethernet PHY device further comprises a Medium Access Control (MAC) layer configured to manage (i) uninterrupted transmission of the outbound data signals to the peer transceiver, and (ii) pausing transmission of the outbound data signals to the peer transceiver while transmitting the retraining signals to the peer transceiver.

9. The Ethernet PHY device according to claim 1, wherein in response to identifying that the peer transceiver also requires retraining, the processor is configured to coordinate with the peer transceiver serial retraining of the local transceiver and the peer transceiver in a specified order.

10. A method for communication, comprising:

in an Ethernet Physical Layer (PHY) device for use in an Ethernet network in a vehicle, communicating, by a local transceiver, with a peer transceiver over a bidirectional Ethernet link in the vehicle;

setting the local transceiver to receive inbound data signals from the peer transceiver; and in response to detecting that during data mode reception a reception quality of the inbound data signals has degraded to below a specified threshold, (i) alerting the peer transceiver that retraining of the local transceiver is required, and (ii) setting the local transceiver to receive inbound retraining signals from the peer transceiver while concurrently transmitting outbound data signals to the peer transceiver.

11. The method according to claim 10, wherein, in response to receiving from the peer transceiver an alert signal indicating that the peer transceiver requires retraining, configuring the local transceiver to transmit outbound retraining signals to the peer transceiver, while continuing to receive the inbound data signals from the peer transceiver.

12. The method according to claim 10, further comprising, during the retraining, receiving the inbound retraining signals modulated in accordance with a two-level Pulse Amplitude Modulation (PAM-2) modulation scheme, while continuing to transmit the outbound data signals modulated in a high-order modulation scheme that encodes more than a single bit per symbol.

13. The method according to claim 12, wherein the high-order modulation scheme comprises a PAM modulation scheme having more than two levels, or a Double Square (DSQ) modulation scheme.

14. The method according to claim 10, wherein, in response to detecting that following the retraining the reception quality level exceeds another specified signal quality threshold, resetting the local transceiver to receive the inbound data signals from the peer transceiver while continuing to concurrently transmit the outbound data signals to the peer transceiver.

15. The method according to claim 10, wherein the local transceiver comprises a reception path including an adaptive equalizer having one or more taps, and comprising, in receiving the inbound retraining signals, adapting the one or more taps starting with their respective recent values, rather than initializing the one or more taps to other initialization values.

16. The method according to claim 15, wherein a duration of adaptation of the one or more taps while the local transceiver continues to transmit the outbound data signals to the peer transceiver, for achieving a given quality level of reception in the local transceiver, is shorter in the retraining than in link-establishment training.

17. The method according to claim 10, wherein the Ethernet PHY device comprises a Medium Access Control (MAC) layer, and the method further comprises managing by the MAC layer (i) uninterrupted transmission of the outbound data signals to the peer transceiver, and (ii) pausing transmission of the outbound data signals to the peer transceiver while transmitting the outbound retraining signals to the peer transceiver.

18. The method according to claim 10, further comprising, in response to identifying that the peer transceiver also requires retraining, coordinating with the peer transceiver serial retraining of the local PHY transceiver and the peer transceiver in a specified order.

* * * * *